(12) United States Patent
Zhang et al.

(10) Patent No.: US 12,499,613 B2
(45) Date of Patent: Dec. 16, 2025

(54) ATHLETE'S PERSPECTIVE SPORTS GAME BROADCAST SYSTEM BASED ON VR TECHNOLOGY

(71) Applicant: Microsoft Technology Licensing, LLC, Redmond, WA (US)

(72) Inventors: Xiao Zhang, Beijing (CN); Zheng Zhang, San Carlos, CA (US); Tao Xu, Cambridge, MA (US); Jie Tang, Sammamish, WA (US); Yaobo Liang, Beijing (CN); Yanan Wei, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 18/275,193

(22) PCT Filed: Jan. 27, 2022

(86) PCT No.: PCT/US2022/013958
§ 371 (c)(1),
(2) Date: Jul. 31, 2023

(87) PCT Pub. No.: WO2022/182469
PCT Pub. Date: Sep. 1, 2022

(65) Prior Publication Data
US 2024/0153199 A1 May 9, 2024

(30) Foreign Application Priority Data
Feb. 26, 2021 (CN) .......................... 202110218773.7

(51) Int. Cl.
*G06T 15/20* (2011.01)
*G06T 7/194* (2017.01)
(Continued)

(52) U.S. Cl.
CPC ............ *G06T 15/205* (2013.01); *G06T 7/194* (2017.01); *G06T 2207/20081* (2013.01);
(Continued)

(58) Field of Classification Search
None
See application file for complete search history.

(56) References Cited

U.S. PATENT DOCUMENTS 6,307,567 B1 * 10/2001 Cohen-Or ............... G06T 15/10
375/E7.263
6,510,241 B1 1/2003 Vaillant
(Continued)

OTHER PUBLICATIONS

Notice of Allowance Received for Chinese Application No. 202110218773.7, mailed on Dec. 17, 2024, 8 pages. (English Translation Provided).
(Continued)

*Primary Examiner* — Anh-Tuan V Nguyen
(74) *Attorney, Agent, or Firm* — Schwegman Lundberg & Woessner, P.A.

(57) ABSTRACT

The present disclosure proposes a method and apparatus for image transmission for three-dimensional (3D) scene reconstruction. A target image may be obtained. A geometry feature and an appearance feature may be disentangled from the target image. An intermediate image may be reconstructed based on the geometry feature and a reference appearance feature. A difference between the intermediate image and the target image may be determined. The geometry feature may be transmitted to a receiving device for 3D scene reconstruction in response to determining that the difference is lower than a predetermined threshold.

20 Claims, 5 Drawing Sheets

(51) Int. Cl.
*H04N 21/2187* (2011.01)
*H04N 21/2343* (2011.01)
*H04N 21/81* (2011.01)

(52) U.S. Cl.
CPC ............... *G06T 2207/20084* (2013.01); *G06T 2207/30168* (2013.01); *G06T 2207/30221* (2013.01); *G06T 2210/08* (2013.01); *H04N 21/2187* (2013.01); *H04N 21/2343* (2013.01); *H04N 21/816* (2013.01)

(56) References Cited

U.S. PATENT DOCUMENTS

| | | | | |
|---|---|---|---|---|
| 2005/0001841 | A1* | 1/2005 | Francois | G06T 15/205 345/473 |
| 2008/0106544 | A1* | 5/2008 | Lee | H04N 5/144 348/E5.065 |
| 2012/0224629 | A1 | 9/2012 | Bhagavathy et al. | |
| 2016/0197999 | A1* | 7/2016 | Chun | H04L 67/567 709/217 |
| 2021/0279952 | A1* | 9/2021 | Chen | G06N 3/047 |
| 2022/0198738 | A1* | 6/2022 | Xu | G06T 17/00 |
| 2023/0379426 | A1* | 11/2023 | Stone | H04N 7/147 |

OTHER PUBLICATIONS

Notice of First Examination Received for Chinese Application No. 202110218773.7, mailed on Mar. 15, 2024, 8 pages (English Translation Provided).

Lorenz, et al., "Unsupervised Part-Based Disentangling of Object Shape and Appearance", In Proceedings of the IEEE/CVF Conference on Computer Vision and Pattern Recognition, Jun. 15, 2019, pp. 10947-10956.

"International Search Report and Written Opinion Issued in PCT Application No. PCT/US22/013958", Mailed Date: Jul. 15, 2022, 10 Pages.

Siddeq, "DCT and DST Based Image Compression for 3D Reconstruction", In Journal of 3D Research, vol. 8, Issue 1, Feb. 4, 2017, 19 Pages.

Yao, et al., "3D-Aware Scene Manipulation via Inverse Graphics", In Repository of arXiv:1808.09351v1, Aug. 28, 2018, 10 Pages.

* cited by examiner

ATHLETE'S PERSPECTIVE SPORTS GAME BROADCAST SYSTEM BASED ON VR TECHNOLOGY

CROSS-REFERENCE TO RELATED APPLICATION

This application is a U.S. National Stage Filing under 35 U.S.C. 371 of International Patent Application Serial No. PCT/US2022/013958, filed Jan. 27, 2022, and published as WO 2022/182469 A1 on Sep. 1, 2022, which claims priority to Chinese Application No. 202110218773.7, filed Feb. 26, 2021, which applications and publication are incorporated herein by reference in their entirety.

BACKGROUND 3D scene reconstruction may refer to a process for establishing a 3D mathematical model suitable for computer representation and processing for a scene in the objective world, which is a key technology for establishing virtual reality that expresses the objective world in a computer. For example, in image-based 3D scene reconstruction, 3D information may be reconstructed and the 3D scene may be reproduced with multiple scene images taken from different angles through a predetermined algorithm. 3D scene reconstruction has been widely used in e.g., industrial measurement, architectural design, medical imaging, 3D animation games, virtual reality (VR), etc.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method and apparatus for image transmission for 3D scene reconstruction. A target image may be obtained. A geometry feature and an appearance feature may be disentangled from the target image. An intermediate image may be reconstructed based on the geometry feature and a reference appearance feature. A difference between the intermediate image and the target image may be determined. The geometry feature may be transmitted to a receiving device for 3D scene reconstruction in response to determining that the difference is lower than a predetermined threshold.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

DETAILED DESCRIPTION

Figure 1:
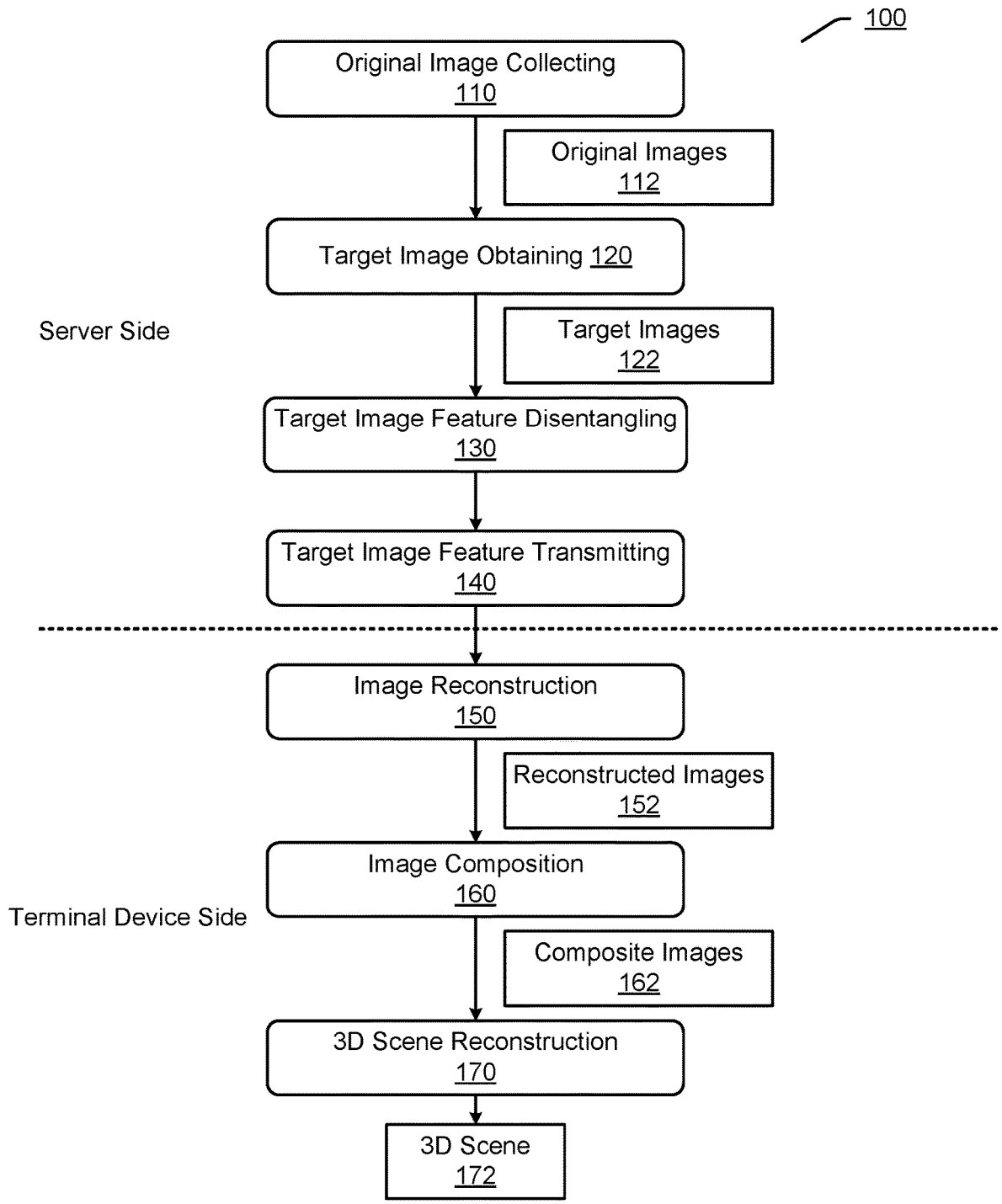
FIG. 1 illustrates an exemplary process for 3D scene reconstruction according to an embodiment of the present disclosure.

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

There are some existing technologies for performing image-based 3D scene reconstruction. These technologies collect multiple original images taken by multiple pre-deployed cameras through a server, and then transmit the collected multiple original images to a terminal device for reconstructing a 3D scene. Generally, in order to obtain a better 3D scene reconstruction effect, a large number of cameras with high imaging quality need to be deployed. Correspondingly, the amount of data carried by the original images taken by these cameras is also huge. Therefore, the process for transmitting these original images to the terminal device requires a lot of bandwidth resources.

Embodiments of the present disclosure propose an improved method for image transmission for 3D scene reconstruction. The method may involve a process for transmitting information of an image used for 3D scene reconstruction from a server to a receiving device that performs 3D scene reconstruction. The receiving device may be, e.g., a terminal device local to a user and capable of reconstructing a 3D scene, e.g., a device based on VR technology, such as VR glasses, VR helmets, etc.

In an aspect, the embodiments of the present disclosure propose to disentangle a geometry feature and an appearance feature from a target image from an original image, and determine how to transmit information of the target image to a terminal device according to whether an image reconstructed based on the geometry feature and the reference appearance feature meets a quality requirement. Herein, a target image may be an image associated with a target object extracted from a foreground image of an original image, wherein the target object may broadly refer to various entities existing in the objective world, e.g., people, items, etc. Taking the 3D scene reconstruction based on a live broadcast of a basketball game as an example, the target object may be a basketball player on the arena, a basketball used for the game, etc. A geometry feature may refer to an information set disentangled from a target image and used to describe the shape, pose, action, etc., of a target object, which may be represented with a small amount of data. An appearance feature may refer to an information set disentangled from the target image and used to describe texture, skin, color, brightness, etc., of a target object, which may require a relatively large amount of data to represent. A reference appearance feature may refer to an appearance feature that is stored in a server and/or a terminal device and is associated with a specific target object. When an image reconstructed based on a geometry feature and a reference appearance feature associated with the same target object as the geometry feature meets a quality requirement, only the geometry feature may be transmitted to a terminal device; while when the image reconstructed based on the geometry feature and the reference appearance feature associated with the same target object as the geometry feature does not meet the quality requirement, the reference appearance feature may be updated based at least on the appearance feature, and the geometry feature and the updated reference appearance feature may be transmitted to the terminal device. The reference appearance feature describes texture, skin, color, brightness, etc., of the target object, which usually change little during a certain time period, thus an image reconstructed based on the geometry feature and the reference appearance feature may meet the quality requirement most of the time. Therefore, in the case that the terminal device has obtained and stored the reference appearance feature of the target object, most of the time only the geometry feature of the target object with a small amount of data needs to be transmitted to the terminal device, which may significantly reduce the amount of data transmitted, increase transmission speed and reduce transmission delay. This is especially beneficial in the case of 3D scene reconstruction based on live broadcast.

In another aspect, the embodiments of the present disclosure propose that after a 3D scene is reconstructed, the 3D scene may be projected as a two-dimensional (2D) image corresponding to a perspective of a target person. Herein, a target person may be a person existing in a 3D scene. Taking a 3D scene based on a live broadcast of a sports event as an example, the target person may be an athlete on the arena. The target person may wear a portable device that can obtain his or her perspective in real time. When a user selects a target person through a terminal device associated with the user, the terminal device may obtain a perspective associated with the target person in real time, and project a 3D scene as a 2D image corresponding to the perspective in real time. In this way, the user can watch the game or performance at close range from the perspective of the target person, thereby obtaining a richer and more vivid viewing experience.

It should be appreciated that although the foregoing and following discussion may involve examples of image transmission in the scenario of 3D scene reconstruction, the embodiments of the present disclosure are not limited to this, but may perform image transmission in other scenarios such as live video broadcast, etc., in a similar manner.

FIG. 1 illustrates an exemplary process 100 for 3D scene reconstruction according to an embodiment of the present disclosure. The process 100 may reconstruct a 3D scene with at least a set of original images taken by a set of cameras. The process 100 may be performed by a server and a terminal device in cooperation.

At 110, a set of original images 112 taken by a set of cameras may be collected through a server. The set of cameras may be pre-deployed in the actual scene. Taking a sports game scene as an example, multiple cameras may be deployed at different locations such as stadiums, auditoriums, passages, etc., so that these cameras may take images from different shooting angles. In an implementation, the set of original images may be taken by the set of cameras at the same time. Accordingly, the set of original images corresponding to the same time may be used to reconstruct a 3D scene at that time through the process 100. It should be appreciated that the set of original images may be taken by the set of cameras in real time, so that the process 100 may be performed for applications e.g., involving live streaming, or the set of original images may be previously taken by the set of cameras, so that the process 100 may be performed for applications e.g., involving playing recorded content.

At 120, one or more target images may be obtained from each original image in the set of collected original images 112 through the server, thereby obtaining a set of target images 122. For example, a foreground image may be segmented from the original image through known methods such as foreground and background segmentation, matting, etc., and one or more target images may be extracted from the foreground image. The foreground image may be an image of one or more target objects. For example, one or more target objects may be detected from the foreground image through a known object detecting method, and for each target object of the detected one or more target objects, a part corresponding to the target object is extracted from the foreground image as the target image associated with the target object. In addition, when extracting the target image from the foreground image, the position of the target image in the foreground image may also be obtained. Preferably, a background image of each original image in the set of original images 112 may be previously determined, and the background image may be previously transmitted to the terminal device, e.g., the background image may be determined and transmitted before 3D scene reconstruction, thereby reducing bandwidth usage during 3D scene reconstruction. Generally, during a certain time period, e.g., during a live broadcast, a camera taking original images is fixed at a specific position, and parameters such as a direction, a field of view, etc., are unchanged. Accordingly, background images of multiple original images taken by the camera during the time period may also have small changes. A original image taken by the camera may be previously collected, and a background image may be extracted from the previously collected original image through methods such as foreground and background segmentation and matting as the background image of an original image taken later by this camera. Taking a 3D scene reconstruction based on live broadcast of a sports event as an example, the original image used to determine the background image may be collected before the game. Alternatively, a piece of video taken by the camera may be previously collected, and the unchanged part from the previously collected video may be identified as the background image of the original image taken later by the camera. Continuing to take the 3D scene reconstruction based on live broadcast of a sports event as an example, the video used to determine the background image may be collected during the warm-up activity before the start of the game. The determined background image may then be used to compose images for 3D scene reconstruction.

After obtaining the set of target images 122, an image transmission and image reconstruction process may be performed on each target image in the set of target images 122, so that at least part of information of the target image is transmitted from the server to the terminal device, and an image for 3D scene reconstruction is reconstructed at the terminal device based at least on the received information. The image transmission and image reconstruction process may be performed through steps 130 to 150.

At 130, feature disentangling may be performed on each target image in the obtained set of target images 122 through the server. For example, a geometry feature and an appearance feature may be disentangled from each target image. An exemplary process for feature disentangling will be described later in conjunction with FIG. 2.

At 140, at least a part of information of each target image may be transmitted to the terminal device through the server. The geometry feature disentangled from the target image may be deterministically transmitted to the terminal device, and the appearance feature is selectively used to update a reference appearance feature stored at the server that is associated with the same target object with the target image. In the case where the reference appearance feature is updated, the updated reference appearance feature may be transmitted to the terminal device along with the geometry feature. An exemplary process for feature transmission will be described later in conjunction with FIG. 2.

At 150, image reconstruction may be performed through the terminal device. In the case that the server only transmits the geometry feature of the target image, the terminal device may receive the geometry feature, and perform image reconstruction based on the geometry feature and its stored reference appearance feature associated with the same target object as the target image. In the case where the server transmits the geometry feature and the updated reference appearance feature, the terminal device may receive the geometry feature and the updated reference appearance feature, and perform image reconstruction based on the geometry feature and the updated reference appearance feature. An exemplary process for image reconstruction will be described later in conjunction with FIG. 2. Herein, an image obtained through image reconstruction at a terminal device may be referred to as a reconstructed image. The steps 130 to 150 may be performed for each target image in the set of target images 122, thereby obtaining a set of reconstructed images 152.

Since the reconstructed image is based on the geometry feature disentangled from the target image, or reconstructed from the geometry feature and the reference appearance feature, the reconstructed image only contains the information in the target image. As described above, the target image is extracted from the foreground image segmented from the original image taken by the camera, thus the target image only contains the information in the foreground image. Accordingly, the reconstructed image also only contains the information in the foreground image. At 160, the terminal device may use the reconstructed image as a foreground image to compose with its corresponding background image. For example, one or more reconstructed images corresponding to one or more target images extracted from the original image may be used as a foreground image to compose with a background image corresponding to the original image. For each reconstructed image, the position of the reconstructed image in the foreground image may be determined based on the position of the target image corresponding to the reconstructed image in the foreground image. Herein, an image obtained through image composition may be referred to as a composite image. The step 160 may be performed for each reconstructed image in the set of reconstructed images 152, thereby obtaining a set of composite images 162.

At 170, a 3D scene reconstruction may be performed based at least on the set of composite images 162 to obtain a 3D scene 172. For example, the 3D scene may be reconstructed based on the set of composite images 162 and camera parameters of the set of cameras that took the set of original images 112. Camera parameters of a camera may include, e.g., spatial position coordinates of the camera in real space, a direction or orientation of the camera, a field of view (FOV) parameter of the camera, etc.

It should be appreciated that the process 100 in FIG. 1 is only an example of the process for 3D scene reconstruction. According to actual application requirements, the process for 3D scene reconstruction may include any other steps, and may include more or fewer steps. For example, instead of previously determining and transmitting the background image, the background image may be periodically determined during the 3D scene reconstruction, and the determined background image may be periodically transmitted to the terminal device for composing a composite image for 3D scene reconstruction. In addition, the specific order or hierarchy of the steps in the process 100 is only exemplary, and the process for 3D scene reconstruction may be performed in an order different from the described one.

Figure 2:
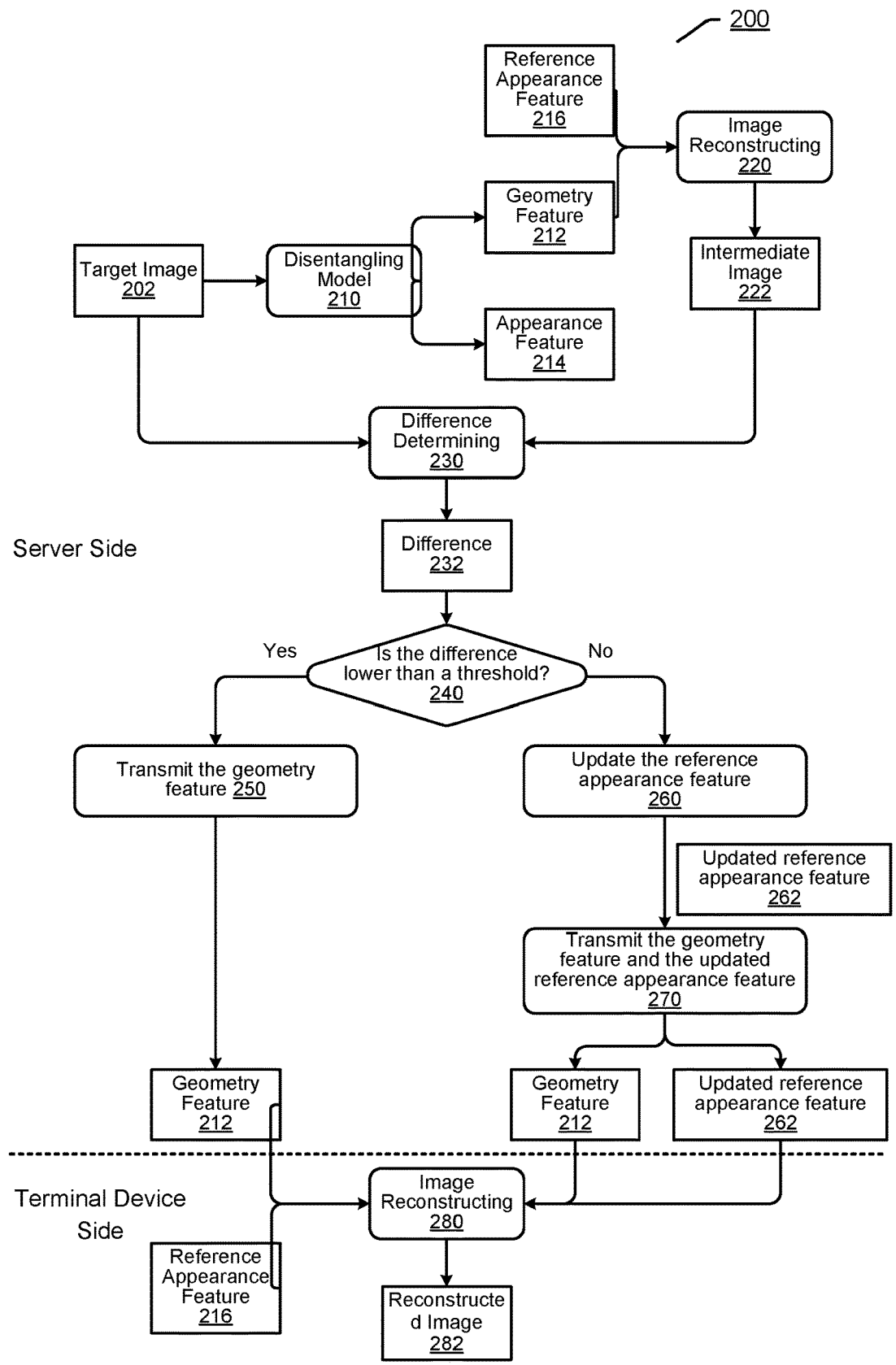
FIG. 2 illustrates an exemplary process for image transmission and image reconstruction according to an embodiment of the present disclosure.

FIG. 2 illustrates an exemplary process 200 for image transmission and image reconstruction according to an embodiment of the present disclosure. The process 200 may be performed by a server and a terminal device in cooperation, and may correspond to the steps 130 to 150 in FIG. 1, e.g., the processing of a disentangling model 210 may correspond to the step 130 in FIG. 1, the steps 220-270 may correspond to the step 140 in FIG. 1 and the step 280 may correspond to the step 150 in FIG. 1. Through the process 200, information of a target image 202 may be transmitted from the server to the terminal device, and a reconstructed image 282 corresponding to the target image 202 may be reconstructed at the terminal device. The target image 202 may correspond to one target image in the set of target images 122 in FIG. 1, and the reconstructed image 282 may correspond to one reconstructed image corresponding to the target image 202 in the set of reconstructed images 152 in FIG. 1.

The target image 202 may be provided to the disentangling model 210 at the server. The disentangling model 210 may be a model which is based on a neural network, e.g., a model which is based on a Residual Network (ResNet). The disentangling model 210 may disentangle a geometry feature 212 and an appearance feature 214 from the target image 202. An exemplary process for training the disentangling model will be described later in conjunction with FIG. 4.

Figure 3:
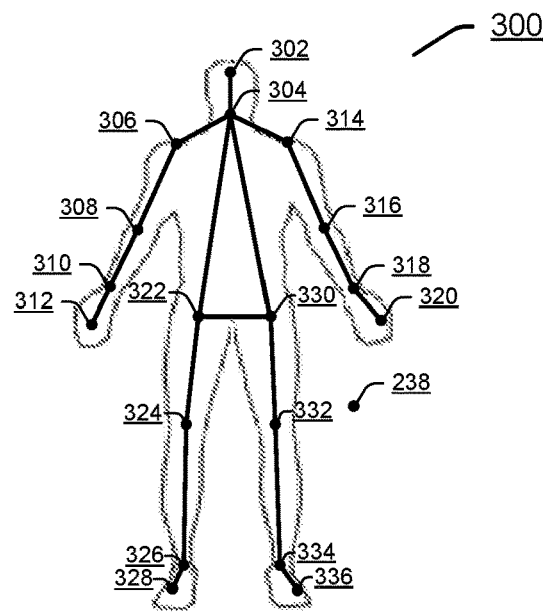
FIG. 3 is a schematic diagram illustrating exemplary positions and connection relationships of key points of a human body according to an embodiment of the present disclosure.

Taking an target object associated with the target image 202 being a person as an example, the geometry feature 212 disentangled from the target image 202 may be an information set used to represent a skeleton structure of a human body, and the information set may include, e.g., information related to positions of various key points of the human body in the target image and/or connection relationships between the key points. FIG. 3 is a schematic diagram 300 illustrating exemplary positions and connection relationships of key points of a human body according to an embodiment of the present disclosure. The diagram 300 illustrates 18 key points extracted from a skeleton structure of a human body, including: head 302, neck 304, right shoulder 306, right elbow 308, right wrist 310, right hand 312, left shoulder 314, left elbow 316, left wrist 318, left hand 320, right hip 322, right knee 324, right ankle 326, right foot 328, left hip 330, left knee 332, left ankle 334, and left foot 336. In addition, the diagram 300 also illustrates connection relationship between these key points through lines, e.g., there is a connection relationship between the head 302 and the neck 304, and there is a connection relationship between the neck 304 and the right hip 322, etc. It should be appreciated that the number and positions of the key points and the connection relationships between the key points illustrated in FIG. 3 are all exemplary. According to specific application scenarios and requirements, different numbers of key points at different positions and connection relationships between the key points may be marked. In addition, it should be appreciated that for a target object of another type, any other number of key points at any other positions and their connection relationships that facilitate to represent a shape, a pose, an action, etc., of the target object may be marked. The geometry feature 212 may be represented with a small amount of data. For example, in the case where the geometry feature 212 includes information related to the positions of the 18 key points of the human body in the target image, the geometry feature 212 may be a vector with a dimension of 2×18, where "2" indicates that two-dimensional coordinates are used to indicate a position of a key point in the target image.

Referring back to FIG. 2, continue to take the target object associated with the target image 202 being a person as an example, the appearance feature 214 disentangled from the target image 202 may be a set of information used to represent skin, skin color, clothing, etc., of the person. Compared with the geometry feature 212, a relatively large amount of data may be required to represent the appearance feature 214.

The server may store a reference appearance feature 216 associated with the same target object as the target image 202. The reference appearance feature 216 may be associated with a specific camera. For example, the reference appearance feature 216 may be associated with a camera that took an original image corresponding to the target image 202. In this case, the reference appearance feature 216 may be an appearance feature disentangled from a previous target image from this specific camera. Alternatively, the reference appearance feature 216 may be associated with a set of cameras, which may be, e.g., cameras that took original images of the same target object at the same time. In this case, the reference appearance feature 216 may be an appearance feature generated based on a set of appearance features disentangled from a set of previous target images from the set of cameras. For example, a comprehensive appearance feature may be generated through performing a weighted average on the set of appearance features, and the comprehensive appearance feature may be used as the reference appearance feature. A reference appearance feature associated with a set of cameras may include more complete and more stable appearance information of a target object.

According to an embodiment of the present disclosure, it may be determined how to transmit information of the target image 202 to the terminal device according to whether a image reconstructed based on the geometry feature 212 and the reference appearance feature 216 meets a quality requirement. When the image reconstructed based on the geometry feature 212 and the reference appearance feature 216 meets the quality requirement, only the geometry feature 212 may be transmitted to the terminal device; while when the image reconstructed based on the geometry feature 212 and the reference appearance feature 216 does not meet the quality requirement, the reference appearance feature 216 may be updated based at least on the appearance feature 214, and the geometry feature 212 and the updated reference appearance feature may be transmitted to the terminal device.

At 220, image reconstruction may be performed through the server based on the geometry feature 212 and the reference appearance feature 216, to obtain an intermediate image 222. Herein, an image reconstructed at a server based on a geometry feature and a reference appearance feature may be referred to as an intermediate image. The image reconstruction at 220 may be performed through e.g., a known differentiable rendering. The differentiable rendering may calculate a derivative of entire simulation for input feature, such as the geometry feature 212 and the reference appearance feature 216, and may facilitate to solve inverse rendering problems related to light, etc., through combining with gradient-based optimization algorithms.

After the intermediate image 222 is reconstructed, it may be determined whether the quality of the intermediate image 222 meets a predetermined requirement. In an implementation, it may be determined whether the quality of the intermediate image 222 meets the predetermined requirement through determining whether a difference between the intermediate image 222 and the target image 202 is lower than a predetermined threshold.

At 230, the difference between the intermediate image 222 and the target image 202 may be determined to obtain a difference 232. In an implementation, the difference 232 may be determined through determining pixel-by-pixel differences between the intermediate image 222 and the target image 202. For example, in the case of using a RGB (Red, Green, Blue) color space to represent pixels, each pixel of the intermediate image 222 and the target image 202 may be represented as a three-dimensional vector having three components corresponding to the R value, the G value, and the B value, respectively. A sub-difference between each pixel in a set of pixels of the intermediate image 222 and a corresponding pixel in the set of pixels of the target image 202 may be calculated first, to obtain a set of sub-differences. For example, a sub-difference between two pixels may be calculated through calculating the Euclidean distance between the two pixels. Subsequently, the difference 232 may be calculated based on the set of sub-differences. For example, the difference 232 may be calculated as the average of the set of sub-differences. It should be appreciated that the set of pixels of the intermediate image 222 and the set of pixels of the target image 202 used to calculate the sub-differences may be all pixels of the intermediate image 222 and all pixels of the target image 202, respectively. Alternatively, the set of pixels of the intermediate image 222 and the set of pixels of the target image 202 used to calculate the sub-differences may be partial pixels selected from the intermediate image 222 and partial pixels selected from the target image 202, respectively. In addition, it should be appreciated that the method for determining the difference between the intermediate image and the target image described above is only exemplary. According to actual application requirements, the difference between the intermediate image and the target image may also be determined in other ways.

After the difference 232 is determined, at 240, it may be determined whether the difference 232 is lower than a predetermined threshold.

If it is determined at 240 that the difference 232 is lower than the predetermined threshold, the process 200 may proceed to 250 where only the geometry feature 212 disentangled from the target image 202 may be transmitted to the terminal device. As described above, the intermediate image 222 is reconstructed based on the geometry feature 212 disentangled from the target image 202 and the reference appearance feature 216 stored in the server. The reference appearance feature 216 may be previously transmitted and stored in the terminal device. For example, before the server obtains the target image 202, the reference appearance feature 216 may be transmitted to the terminal device. Therefore, in this case, it is unnecessary to transmit the appearance feature 214 to the terminal device. After receiving the geometry feature 212, at 280, the terminal device may perform image reconstruction based on the received geometry feature 212 and the stored reference appearance feature 216, to obtain a reconstructed image 282.

If it is determined at 240 that the difference 232 is not lower than the predetermined threshold, the process 200 may proceed to 260 where the reference appearance feature 216 may be updated to obtain a updated reference appearance feature 262. In the case where the reference appearance feature 216 is associated with a specific camera, the reference appearance feature 216 may be updated to the appearance feature 214 disentangled from the target image 202, i.e., the updated reference appearance feature 262 may be the appearance feature 214. In the case where the reference appearance feature 216 is associated with a set of cameras, a set of target images associated with the same target object as the target image 202 may be obtained, and the set of target images may be from a set of original images taken by the set of cameras at the same time. The set of target images may include the target image 202. In an implementation, it may be determined whether two target images are associated with the same target object based on positions of target objects associated therewith. A comprehensive appearance feature may be generated based on a set of appearance features disentangled from the set of target images. For example, the comprehensive appearance feature may be generated through performing a weighted average on the set of appearance features. Then, the reference appearance feature 216 may be updated to the comprehensive appearance feature, i.e., the updated reference appearance feature 262 may be the comprehensive appearance feature. At 270, the geometry feature 212 disentangled from the target image 202 and the updated reference appearance feature 262 may be transmitted to the terminal device. The process 200 may proceed to 280, and at 280, the terminal device, after receiving the geometry feature 212 and the updated reference appearance feature 262, may perform image reconstruction based on the received geometry feature 212 and the updated reference appearance feature 262, to obtain the reconstructed image 282. In addition, the reference appearance feature 216 at the terminal device may also be updated to the updated reference appearance feature 262.

In the process 200, the geometry feature 212 is deterministically transmitted to the terminal device, and only when the image reconstructed based on the geometry feature 212 and the reference appearance feature 216 does not meet the quality requirement, the reference appearance feature 262 updated based at least on the appearance feature 214 will be transmitted to the terminal device. The reference appearance feature 216 describes texture, skin, color, brightness, etc., of the target object, which usually change little during a certain time period. Take a live broadcast of a sports event as an example, during a certain time period, skin and clothing of a athletes on the arena change little. Therefore, the image reconstructed based on the geometry feature 212 and the reference appearance feature 216 may meet the quality requirement most of the time. Accordingly, most of the time, only the geometry feature 212 with a small amount of data needs to be transmitted to the terminal device, which may significantly reduce the amount of data transmitted, increase transmission speed and reduce transmission delay. This is beneficial in the case of 3D scene reconstruction based on live broadcast, especially live broadcast of sports events with many target objects.

It should be appreciated that the process 200 in FIG. 2 is only an example of the process for image transmission and image reconstruction. According to actual application requirements, the process for image transmission and image reconstruction may include any other steps, and may include more or fewer steps. For example, the process for determining whether the quality of the intermediate image 222 meets the predetermined requirement may also be performed through a trained model which is based on a neural network. In addition, the specific order or hierarchy of the steps in the process 200 is only exemplary, and the process for image transmission and image reconstruction may be performed in an order different from the described one.

Figure 4:
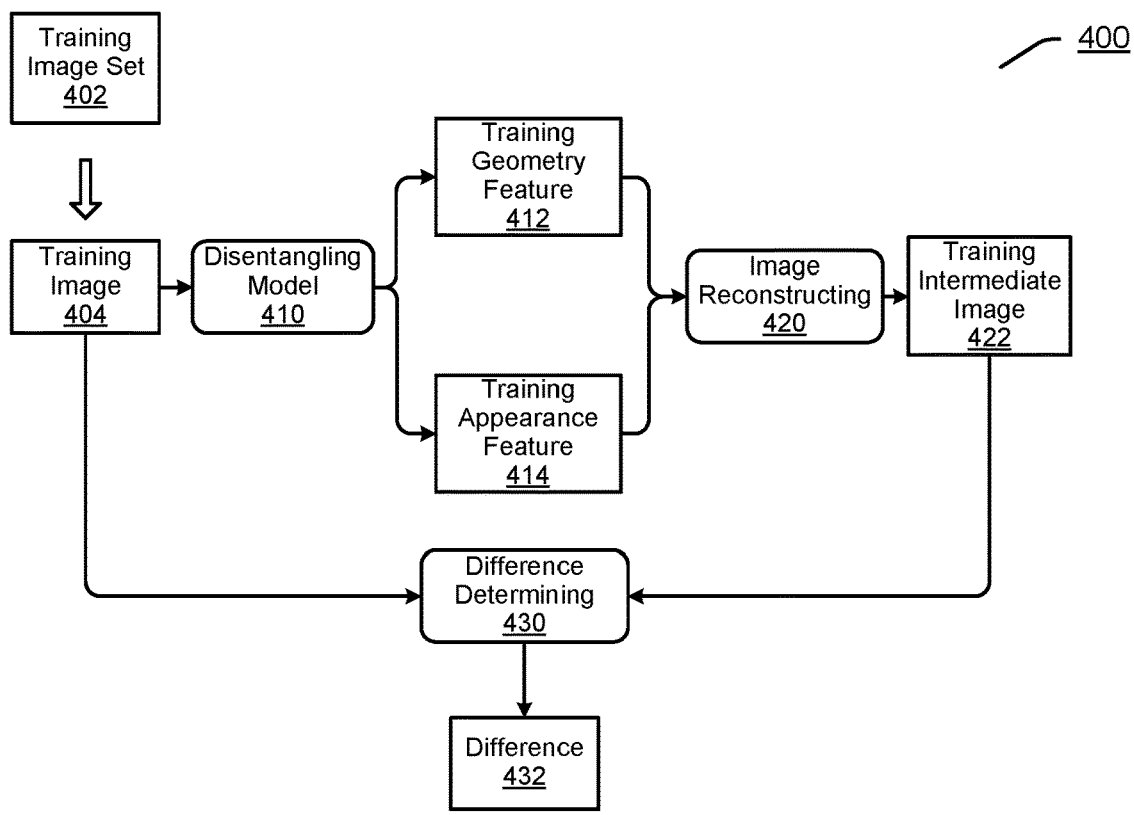
FIG. 4 illustrates an exemplary process for training a disentangling model according to an embodiment of the present disclosure.

FIG. 4 illustrates an exemplary process 400 for training a disentangling model according to an embodiment of the present disclosure. The process 400 may train a disentangling model 410 with a training image set 402, so that when actually deployed, the trained disentangling model 410 may disentangle a geometry feature and an appearance feature from an input image. The disentangling model 410 may correspond to the disentangling model 210 in FIG. 2. Each training image in the training image set 402 may be a target image associated with only one target object. The following takes a training image 404 in the training image set 402 as an example to describe an exemplary process for training the disentangling model 410.

The training image 404 may be provided to the disentangling model 410. The disentangling model 410 may disentangle a training geometry feature 412 and a training appearance feature 414 from the training image 404. At 420, image reconstruction may be performed based on the training geometry feature 412 and the training appearance feature 414, to obtain a training intermediate image 422. The image reconstruction at 420 may be performed in a similar manner to the image reconstruction at 220 in FIG. 2. At 430, a difference between the training intermediate image 422 and the training image 404 may be determined to obtain a difference 432. The difference determining at 430 may be performed in a similar manner to the difference determining at 230 in FIG. 2. The disentangling model 410 may be optimized through minimizing the difference 432. The process 400 may be performed for each training image in the training image set 402, so that the disentangling model 410 may be continuously optimized. It should be appreciated that the process 400 in FIG. 4 is only an example of the process for training a disentangling model. According to actual application requirements, the process for training a disentangling model may comprise any other steps, and may comprise more or fewer steps.

Figure 5:
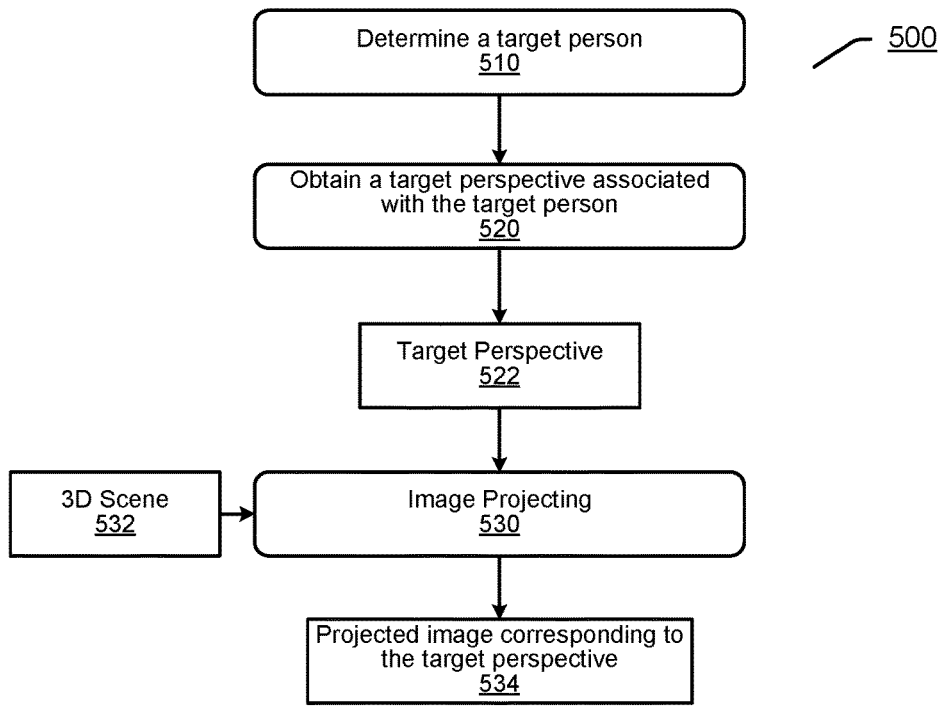
FIG. 5 illustrates an exemplary process for image projection according to an embodiment of the present disclosure.

Through the process 100 in FIG. 1, a 3D scene may be reconstructed. According to an embodiment of the present disclosure, the reconstructed 3D scene may be further used to realize image projection, so as to present a user with a projected image corresponding to a target perspective associated with a target person. Herein, a target perspective may refer to a perspective associated with a target person. FIG. 5 illustrates an exemplary process 500 for image projection according to an embodiment of the present disclosure. The process 500 may be performed by a terminal device associated with a user. Through the process 500, a projected image corresponding to the target perspective may be projected with a 3D scene, and the projected image may be presented to the user.

At 510, a target person may be determined. Taking a 3D scene based on a live broadcast of a sports event as an example, the target person may be an athlete, a referee, etc. on the arena; taking a 3D scene based on a live broadcast of a concert as an example, the target person may be a singer, a host, etc. on the stage. The target person may be e.g., selected by the user through an user interface of the terminal device, or automatically detected based on the user's behavior.

At 520, a target perspective 522 associated with the target person may be obtained. The target perspective 522 may be expressed in a manner similar to camera parameters, e.g., it may be expressed by at least one of spatial position coordinates, direction, and field of view parameter. The target person may wear a portable device that can obtain his or her perspective in real time. For example, for highly confrontational or fierce scenes, such as a basketball game, a sprinting game, etc., the target person may carry a lightweight device that can obtain his or her perspective on his or her hands or other body parts or clothes, e.g., a bracelet, etc. In addition, for less confrontational or gentle scenes, such as a kayaking race, a concert, etc., the target person may also wear a device such as a miniature camera on a helmet or headband that can obtain his or her perspective and additionally collect images and sounds. These portable devices may transmit the obtained target perspective to the server in real time. The terminal device may obtain the target perspective 522 associated with the target person from the server. For example, the terminal device may transmit a determined identifier of the target person to the server. The server may transmit the target perspective 522 associated with the target person to the terminal device in real time in response to receiving the identifier of the target person.

At 530, an image projecting process may be performed. For example, a projected image 534 corresponding to the target perspective 522 may be generated with the reconstructed 3D scene 532 through a trained scene reconstruction network. The projected image 534 may then be presented to the user.

In the process 500, when the user selects the target person through the terminal device associated with the user, the terminal device may obtain the perspective associated with the target person in real time, and project the 3D scene as a 2D image corresponding to the perspective in real time. In this way, the user can watch the game or performance at close range from the perspective of the target person, thereby obtaining a richer and more vivid viewing experience. For example, in the case of 3D scene reconstruction based on live broadcast of a sports event, the user may watch the game closely from a perspective of an athlete on the arena, e.g., may see expressions and actions of athletes near this athlete, or even feel the athlete's fast movement through watching fast-switching screens, thereby experiencing the intensity and excitement of the game firsthand.

It should be appreciated that the process 500 in FIG. 5 is only an example of the process for image projection. According to actual application requirements, the process for image projection may include any other steps, and may include more or fewer steps. For example, after the projected image 534 corresponding to the target perspective 522 is generated, an image enhancement process may be performed on the projected image 534 to improve the image quality through, e.g., an image enhancement network based on a Generative Adversarial Network (GAN). In addition, it should be appreciated that in the case where the target person wears a device capable of additionally collecting images and sounds, the collected images and sounds may participate in 3D scene reconstruction, to obtain a more complete and rich 3D scene. Furthermore, a user may also send bullet comments through his or her associated terminal device to interact with other viewers.

Figure 6:
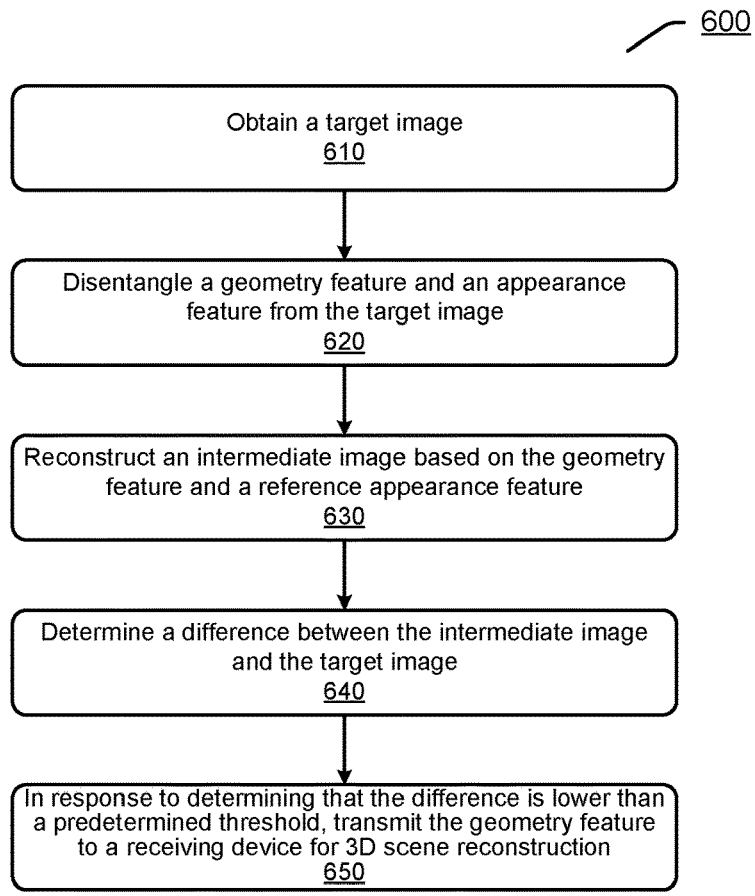
FIG. 6 is a flowchart of an exemplary method for image transmission for 3D scene reconstruction according to an embodiment of the present disclosure.

FIG. 6 is a flowchart of an exemplary method 600 for image transmission for 3D scene reconstruction according to an embodiment of the present disclosure.

At 610, a target image may be obtained.

At 620, a geometry feature and an appearance feature may be disentangled from the target image.

At 630, an intermediate image may be reconstructed based on the geometry feature and a reference appearance feature.

At 640, a difference between the intermediate image and the target image may be determined.

At 650, the geometry feature may be transmitted to a receiving device for 3D scene reconstruction in response to determining that the difference is lower than a predetermined threshold.

In an implementation, the target image and the reference appearance feature may be associated with the same target object.

In an implementation, the obtaining a target image may comprise: receiving an original image taken by a camera; and extracting the target image from the original image.

The extracting the target image from the original image comprises: segmenting a foreground image from the original image; and extracting the target image from the foreground image.

The method 600 may further comprise: transmitting a predetermined background image to the receiving device.

In an implementation, the disentangling a geometry feature and an appearance feature from the target image may be performed through a disentangling model which is based on a neural network.

The disentangling model may be trained through: disentangling a training geometry feature and a training appearance feature from a training image through the disentangling model; reconstructing a training intermediate image based on the training geometry feature and the training appearance feature; determining a difference between the training intermediate image and the training image; and optimizing the disentangling model through minimizing the difference between the training intermediate image and the training image.

In an implementation, the determining a difference between the intermediate image and the target image may comprise: calculating a sub-difference between each pixel in a set of pixels of the intermediate image and a corresponding pixel in a set of pixels of the target image, to obtain a set of sub-differences; and calculating the difference based on the set of sub-differences.

In an implementation, the method 600 may further comprise: in response to determining that the difference is not lower than the predetermined threshold: updating the reference appearance feature; and transmitting the geometry feature and the updated reference appearance feature to the receiving device for 3D scene reconstruction.

The updating the reference appearance feature may comprise: updating the reference appearance feature to the appearance feature.

The target image may be from a set of target images. The set of target images may be associated with the same target object and are from a set of original images taken at the same time. The updating the reference appearance feature may comprise: generating a comprehensive appearance feature based on a set of appearance features disentangled from the set of target images; and updating the reference appearance feature to the comprehensive appearance feature.

In an implementation, the reconstructing an intermediate image may be performed through differentiable rendering.

In an implementation, the method 600 may further comprise: transmitting the reference appearance feature to the receiving device before obtaining the target image.

In an implementation, the 3D scene reconstruction may be performed using at least an image reconstructed based at least on the geometry feature.

It should be appreciated that the method 600 may further comprise any step/process for image transmission for 3D scene reconstruction according to the embodiments of the present disclosure described above.

Figure 7:
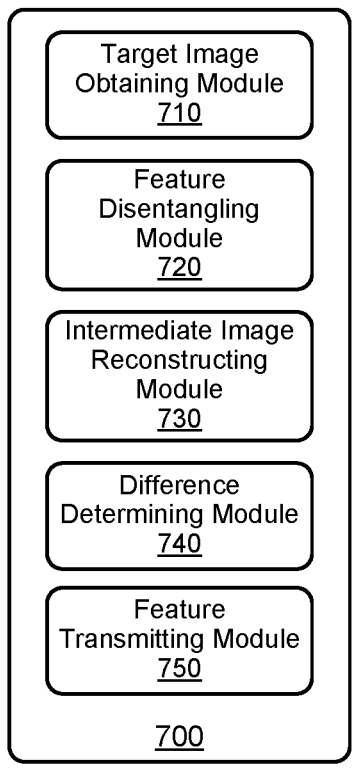
FIG. 7 illustrates an exemplary apparatus for image transmission for 3D scene reconstruction according to an embodiment of the present disclosure.

FIG. 7 illustrates an exemplary apparatus 700 for image transmission for 3D scene reconstruction according to an embodiment of the present disclosure.

The apparatus 700 may comprise: a target image obtaining module 710, for obtaining a target image; a feature disentangling module 720, for disentangling a geometry feature and an appearance feature from the target image; an intermediate image reconstructing module 730, for reconstructing an intermediate image based on the geometry feature and a reference appearance feature; a difference determining module 740, for determining a difference between the intermediate image and the target image; and a feature transmitting module 750, for in response to determining that the difference is lower than a predetermined threshold, transmitting the geometry feature to a receiving device for 3D scene reconstruction. Moreover, the apparatus 700 may further comprise any other modules configured for image transmission for 3D scene reconstruction according to the embodiments of the present disclosure described above.

Figure 8:
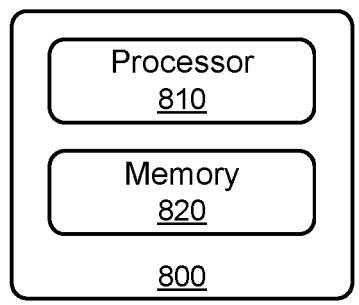
FIG. 8 illustrates an exemplary apparatus for image transmission for 3D scene reconstruction according to an embodiment of the present disclosure.

FIG. 8 illustrates an exemplary apparatus 800 for image transmission for 3D scene reconstruction according to an embodiment of the present disclosure.

The apparatus 800 may comprise at least one processor 810 and a memory 820 storing computer-executable instructions. The computer-executable instructions, when executed, may cause the at least one processor 810 to: obtain a target image, disentangle a geometry feature and an appearance feature from the target image, reconstruct an intermediate image based on the geometry feature and a reference appearance feature, determine a difference between the intermediate image and the target image, and in response to determining that the difference is lower than a predetermined threshold, transmit the geometry feature to a receiving device for 3D scene reconstruction.

In an implementation, the disentangling a geometry feature and an appearance feature from the target image may be performed through a disentangling model which is based on a neural network.

The disentangling model may be trained through: disentangling a training geometry feature and a training appearance feature from a training image through the disentangling model; reconstructing a training intermediate image based on the training geometry feature and the training appearance feature; determining a difference between the training intermediate image and the training image; and optimizing the disentangling model through minimizing the difference between the training intermediate image and the training image.

In an implementation, the computer-executable instructions, when executed, may further cause the at least one processor 810 to: in response to determining that the difference is not lower than the predetermined threshold: update the reference appearance feature; and transmit the geometry feature and the updated reference appearance feature to the receiving device for 3D scene reconstruction.

The target image may be from a set of target images. The set of target images may be associated with the same target object and are from a set of original images taken at the same time. The updating the reference appearance feature may comprise: generating a comprehensive appearance feature based on a set of appearance features disentangled from the set of target images; and updating the reference appearance feature to the comprehensive appearance feature.

It should be appreciated that the processor 810 may further perform any other step/process for the method for image transmission for 3D scene reconstruction according to the embodiments of the present disclosure described above.

The embodiments of the present disclosure propose a computer program product for image transmission for 3D scene reconstruction, comprising a computer program that is executed by at least one processor for: obtaining a target image; disentangling a geometry feature and an appearance feature from the target image; reconstructing an intermediate image based on the geometry feature and a reference appearance feature; determining a difference between the intermediate image and the target image; and in response to determining that the difference is lower than a predetermined threshold, transmitting the geometry feature to a receiving device for 3D scene reconstruction. In addition, the computer programs may further be performed for implementing any other step/process for image transmission for 3D scene reconstruction according to the embodiments of the present disclosure described above.

The embodiments of the present disclosure may be embodied in non-transitory computer-readable medium. The non-transitory computer readable medium may comprise instructions that, when executed, cause one or more processors to perform any operation of a method for image transmission for 3D scene reconstruction according to the embodiments of the present disclosure as described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functions of a processor, any portion of a processor, or any combination of processors presented in this disclosure may be implemented with software executed by a microprocessor, a microcontroller, a DSP, or other suitable platforms.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, e.g., memory, the memory may be e.g., a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown separate from a processor in the various aspects presented throughout the present disclosure, the memory may be internal to the processor, e.g., a cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein and encompassed by the claims.

The invention claimed is:

1. A method for image transmission for three-dimensional (3D) scene reconstruction, comprising:
    obtaining a target image;
    disentangling a geometry feature and an appearance feature from the target image;
    reconstructing an intermediate image based on the geometry feature and a reference appearance feature;
    determining a difference between the intermediate image and the target image; and
    in response to determining that the difference is not lower than a predetermined threshold:
    updating the reference appearance feature; and
    transmitting the geometry feature and the updated reference appearance feature to a receiving device for 3D scene reconstruction.

2. The method of claim 1, wherein the target image and the reference appearance feature are associated with a same target object.

3. The method of claim 1, wherein the obtaining a target image comprises:
    receiving an original image taken by a camera; and
    extracting the target image from the original image.

4. The method of claim 3, wherein the extracting the target image from the original image comprises:
    segmenting a foreground image from the original image; and
    extracting the target image from the foreground image.

5. The method of claim 4, further comprising:
    transmitting a predetermined background image to the receiving device.

6. The method of claim 1, wherein the disentangling a geometry feature and an appearance feature from the target image is performed through a disentangling model which is based on a neural network.

7. The method of claim 6, wherein the disentangling model is trained through:
    disentangling a training geometry feature and a training appearance feature from a training image through the disentangling model;
    reconstructing a training intermediate image based on the training geometry feature and the training appearance feature;
    determining a difference between the training intermediate image and the training image; and
    optimizing the disentangling model through minimizing the difference between the training intermediate image and the training image.

8. The method of claim 1, wherein the determining a difference between the intermediate image and the target image comprises:
    calculating a sub-difference between each pixel in a set of pixels of the intermediate image and a corresponding pixel in a set of pixels of the target image, to obtain a set of sub-differences; and
    calculating the difference based on the set of sub-differences.

9. The method of claim 1, wherein the updating the reference appearance feature comprises:
    updating the reference appearance feature to the appearance feature.

10. The method of claim 1, wherein the target image is from a set of target images, the set of target images are associated with a same target object and are from a set of original images taken at a same time, and the updating the reference appearance feature comprises:
    generating a comprehensive appearance feature based on a set of appearance features disentangled from the set of target images; and
    updating the reference appearance feature to the comprehensive appearance feature.

11. The method of claim 1, wherein the reconstructing an intermediate image is performed through differentiable rendering.

12. The method of claim 1, further comprising:
    transmitting the reference appearance feature to the receiving device before obtaining the target image.

13. The method of claim 1, further comprising:
    obtaining a second target image;
    disentangling a second geometry feature and a second appearance feature from the second target image;
    reconstructing a second intermediate image based on the second geometry feature and the second appearance feature;
    determining a second difference between the second intermediate image and the second target image; and
    in response to determining that the second difference is lower than the predetermined threshold, transmitting the second geometry feature to the receiving device for 3D scene reconstruction.

14. An apparatus for image transmission for three-dimensional (3D) scene reconstruction, comprising:
    at least one processor; and
    a memory storing computer-executable instructions that, when executed, cause the at least one processor to:
    obtain a target image,
    disentangle a geometry feature and an appearance feature from the target image,
    reconstruct an intermediate image based on the geometry feature and a reference appearance feature,
    determine a difference between the intermediate image and the target image, and in response to determining that the difference is not lower than a predetermined threshold:
  updating the reference appearance feature; and
  transmitting the geometry feature and the updated reference appearance feature to a receiving device for 3D scene reconstruction.

15. The apparatus of claim 14, wherein the obtaining a target image comprises:
  receiving an original image taken by a camera; and
  extracting the target image from the original image.

16. The apparatus of claim 15, wherein the extracting the target image from the original image comprises:
  segmenting a foreground image from the original image; and
  extracting the target image from the foreground image.

17. The apparatus of claim 16, further comprising:
  transmitting a predetermined background image to the receiving device.

18. A non-transitory machine-readable medium including instructions that, when executed by a machine, cause the machine to perform operations for image transmission for three-dimensional (3D) scene reconstruction, the operations comprising:
  obtaining a target image;
  disentangling a geometry feature and an appearance feature from the target image;
  reconstructing an intermediate image based on the geometry feature and a reference appearance feature;
  determining a difference between the intermediate image and the target image; and
  in response to determining that the difference is not lower than a predetermined threshold:
  updating the reference appearance feature; and
  transmitting the geometry feature and the updated reference appearance feature to a receiving device for 3D scene reconstruction.

19. The non-transitory machine-readable medium of claim 18, wherein the disentangling a geometry feature and an appearance feature from the target image is performed through a disentangling model which is based on a neural network.

20. The non-transitory machine-readable medium of claim 19, wherein the operations further comprise training the disentangling model by:
  disentangling a training geometry feature and a training appearance feature from a training image through the disentangling model;
  reconstructing a training intermediate image based on the training geometry feature and the training appearance feature;
  determining a difference between the training intermediate image and the training image; and
  optimizing the disentangling model through minimizing the difference between the training intermediate image and the training image.

* * * * *